(12) United States Patent
Jacobsen et al.

(10) Patent No.: US 11,331,169 B2
(45) Date of Patent: May 17, 2022

(54) ADAPTOR FOR ADJUSTABLY MOUNTING A STRUCTURE ONTO A BIOLOGICAL BASE

(71) Applicant: Hagay Jacobsen, Kefar Veradim (IL)

(72) Inventors: Hagay Jacobsen, Kefar Veradim (IL); Vladimir Naiman, Mahalot-Tarshia (IL)

( * ) Notice: Subject to any disclaimer, the term of this patent is extended or adjusted under 35 U.S.C. 154(b) by 484 days.

(21) Appl. No.: 15/770,206

(22) PCT Filed: Feb. 14, 2017

(86) PCT No.: PCT/IL2017/050181
§ 371 (c)(1),
(2) Date: Apr. 22, 2018

(87) PCT Pub. No.: WO2017/153976
PCT Pub. Date: Sep. 14, 2017

(65) Prior Publication Data
US 2018/0303586 A1    Oct. 25, 2018

(30) Foreign Application Priority Data
Mar. 6, 2016 (IL) .......................................... 244461

(51) Int. Cl.
*A61C 8/00* (2006.01)
(52) U.S. Cl.
CPC .......... *A61C 8/0053* (2013.01); *A61C 8/0065* (2013.01); *A61C 8/0068* (2013.01)
(58) Field of Classification Search
CPC ...... A61C 8/005–0066; A61B 17/7037; A61B 17/7049
USPC ....... 433/172–179, 191–196; 606/61, 65, 66, 606/69, 70
See application file for complete search history.

(56) References Cited

U.S. PATENT DOCUMENTS

| 4,713,004 A | | 12/1987 | Linkow et al. | |
|---|---|---|---|---|
| 5,302,125 A | * | 4/1994 | Kownacki | A61C 8/0048 433/172 |
| 5,888,218 A | * | 3/1999 | Folsom | A61C 8/005 623/16.11 |
| 6,187,005 B1 | * | 2/2001 | Brace | A61B 17/7035 606/264 |
| 6,887,242 B2 | * | 5/2005 | Doubler | A61B 17/7035 606/274 |
| 7,195,633 B2 | * | 3/2007 | Medoff | A61B 17/8047 606/309 |

(Continued)

FOREIGN PATENT DOCUMENTS

| DE | 19653229 | * | 6/1998 |
|---|---|---|---|
| GB | 2506634 | * | 4/2012 |
| WO | WO 2014/053850 | | 4/2014 |

(Continued)

*Primary Examiner* — Edward Moran
*Assistant Examiner* — Matthew P Saunders
(74) *Attorney, Agent, or Firm* — Rahman LLC (57) ABSTRACT

A medical adaptor generally featuring an adaptor body extending from a fitment end towards a perch. The adaptor further includes a fitment extending away from the fitment end, and a mortar extending away and integral with the fitment, to terminate at the perch. The adaptor also features a shrinkable collet including a collet face and a collet hole extended from a collet hole towards a collet tail. A collet bolt is threaded into the collet hole such that collet is avoided from getting shrunk and is locked at a desired angular position.

8 Claims, 6 Drawing Sheets

(56) References Cited

U.S. PATENT DOCUMENTS

| | | | | |
|---|---|---|---|---|
| 7,833,248 B2 * | 11/2010 | Markworth | ........ | A61B 17/7049 606/253 |
| 8,162,990 B2 * | 4/2012 | Potash | ............... | A61B 17/7037 606/266 |
| 8,444,680 B2 * | 5/2013 | Dooney, Jr | ........ | A61B 17/8047 606/290 |
| 8,617,216 B2 * | 12/2013 | Brumfield | .......... | A61B 17/7041 606/266 |
| 10,087,982 B2 * | 10/2018 | Faccioli | .............. | F16C 11/0604 |
| 2005/0154392 A1 * | 7/2005 | Medoff | .............. | A61B 17/8047 606/287 |
| 2005/0192572 A1 * | 9/2005 | Abdelgany | ........ | A61B 17/7037 606/266 |
| 2007/0093832 A1 * | 4/2007 | Abdelgany | ........ | A61B 17/7037 606/250 |
| 2009/0118772 A1 * | 5/2009 | Diederich | .......... | A61B 17/8685 606/301 |
| 2009/0246733 A1 * | 10/2009 | Auderset | ............... | A61C 8/0089 433/173 |
| 2010/0036417 A1 * | 2/2010 | James | ................ | A61B 17/8605 606/246 |
| 2010/0291507 A1 * | 11/2010 | Abdelgany | .......... | A61C 8/0053 433/174 |
| 2011/0245876 A1 * | 10/2011 | Brumfield | .......... | A61B 17/7035 606/264 |
| 2012/0288827 A1 | 11/2012 | McBride et al. | | |

FOREIGN PATENT DOCUMENTS

| | | | | |
|---|---|---|---|---|
| WO | WO-2016139671 A1 * | 9/2016 | ........... | A61C 8/0068 |
| WO | WO-2019214773 A1 * | 11/2019 | ........... | A61C 8/0053 |

* cited by examiner

ADAPTOR FOR ADJUSTABLY MOUNTING A STRUCTURE ONTO A BIOLOGICAL BASE

FIELD OF THE INVENTION

Generally disclosed herein is an angularly and/or axially-adjustable adaptor, facilitating a larger angular displacement between mechanically-attached structures and anchors, wherein the anchor is implantable onto a biological base, such as a bone. More specifically, such technology, as a general, non-binding example, may be applied to processes such as attaching a dental structure to an implant anchored onto jaw bones.

BACKGROUND OF THE INVENTION

Generally, biological anchors require to be mounted in a specific trajectory/alignment and cannot be placed arbitrarily. An implant trajectory [i.e., choice of insertion point and direction] is determined by properties of the biological base. U.S. Pat. No. 4,932,868 to Leonard I. Linkow and Anthony W. Rinaldi, titled "Submergible screw-type dental implant and method of utilization", recites, inter alia, "In order to align the artificial tooth or other dental devices with the other teeth of the patient, it may be necessary to have the post portion at an angle to the implant portion." To accomplish that, " . . . the angled shaft and transition collar are replaced with a ball and socket joint which allows for the setting of the angled relationship between the implant portion and the abutment portion at any selected angle within the range of motion of the ball and socket joint, e.g. up to 30-40 degrees. In FIG. 7 the threaded cavity 19 receives the threaded shaft of a lower or inner abutment casing 42. This casing has a generally Y-shape with the lower portion being the shaft that extends into and engage the threads of cavity 19. The upper portion of casing 42 has a hemispherical surface 45 such that it can receive a ball 46. An upper or outer casing 44 screws onto outer threads of the inner casing 42 such that ball 46 is wrapped within the abutment casing, but is free to rotate therein so as to create a ball and socket joint . . . . A relatively large set screw 48 penetrates the ball completely. This set screw 48 has an internal threaded cavity 55 which passes through an upper hexagonal projection 56. Once the implant portion 10 has been located in the bone at the optimal angle, the ball 46 is rotated such that the center axis of the set screw is at the proper angle for mounting of an artificial tooth in line with other teeth in the patient's mouth. Then the hexagonal portion 56 is rotated with a wrench or other tool so the set screw comes into extreme frictional contact with the hemispherical surface 45 of inner casing 42. This prevents further rotation of the ball and the set screw."

U.S. Pat. No. 5,839,898 to Americo Fernandes, titled "Ball Retainer" recites, inter alia, "It is not feasible to place a tooth prosthesis directly into the opening of the anchor due to likely ensuing misalignment between the new tooth prosthesis and existing teeth or prostheses. This occurs because the anchor cannot be arbitrarily mounted in the jaw at an angle appropriate to support the new prosthesis at an orientation parallel to the existing teeth. Rather, the anchor must be oriented so as to engage existing bone tissue of the jaw as solidly as possible. The prosthesis must then be adjusted with respect to axial alignment with and height above the anchor. Since height and alignment require two different adjustments, the dental fraternity has responded by providing an intermediate component which enables height above the anchor to be adjusted independently of axial alignment of the prosthesis to the anchor. This is the component which is the subject of the present invention."

U.S. Pat. No. 6,786,725 to L. Paul Lustig, Federico Castellucci, and Andrew P. Tybinkowski, titled "Dental implant and tool and method for effecting a dental restoration using the same", claims, inter alia, "wherein said implant fixture assembly further comprises a floating nut captured in said housing at said second end thereof, said floating nut having internal threads for threaded engagement with said fastener; and wherein said securement means comprise an opening having a polygonal transverse cross-section at said second end of said housing and substantially polygonal external transverse cross-section defined by said floating nut, whereby when said fastener is tightened, at least some of the sides of said external transverse cross-section of said floating nut engage at least some of the sides of said floating nut engage at least some of the sides of said transverse cross-section of said opening at said second end of said housing."

United States Patent Application 2010/0291507 to Mahmoud F. Abdelgany, titled "Polyaxial Dental Implant", recites, inter alia, " . . . a polyaxial dental implant device comprising an abutment member comprising a channel bored through a longitudinal axis of the abutment member; and an outwardly protruding and expandable round bulbous body coupled to an end of the abutment member; a fixture member coupled to the bulbous body, wherein the fixture member receives the bulbous body; and a pin engaged within the abutment member via the channel and contacting the bulbous body causing the bulbous body to outwardly expand into the fixture member . . . . In addition, the abutment member may comprise a substantially planar lower surface, wherein the bulbous body extends from the lower surface of the abutment member, and wherein the concave socket cups the expandable bulbous body and allows the bulbous body to rotate polyaxially with respect to the fixture member. Moreover, the abutment member may comprise a wall completely circumferentially encircling the channel. Furthermore, the bulbous body of the abutment member may comprise a plurality of slots separating a plurality of bendable flanges of the bulbous body. Additionally, the abutment member is configured as a dental prosthesis comprising a receptacle that receives a deformable head cap. Moreover, the channel may comprise threads. Additionally, each of the channel and the pin may be tapered . . . . A polyaxial dental implant apparatus is further provided comprising an abutment member comprising a channel bored through a longitudinal axis of the abutment member; and an outwardly protruding and expandable round bulbous body coupled to an end of the abutment member; a fixture member coupled to the bulbous body, wherein the fixture member receives the bulbous body; a pin engaged within the abutment member via the channel and contacting the bulbous body causing the bulbous body to outwardly expand into the fixture member; and a deformable head cap positioned over the abutment member, wherein the fixture member is dynamically positioned at a different longitudinal axis than the longitudinal axis of the head cap . . . ."

European Patent Application EP2647347A1 to Triquell Ramón Terrats titled "Prosthetic attachment" discloses, inter alia, " . . . a prosthetic attachment comprising a support piece (1) which can be fixed in a dental implant (2) and a mounting assembly which can be coupled to a prosthetic structure (3), wherein the joint between the support piece (1) and the mounting assembly is a ball-and-socket type joint. The support piece (1) includes a substantially spherical connection section (11) provided with radially distributed flexible sectors. The mounting assembly comprises a primary element (4) with a substantially spherical cavity and provided with a threaded through hole (41) wherein a screw (5) with a spherical head (52) is inserted. Thus, the spherical head can be introduced into the inner region of the connection section of the support piece and the wall that forms the substantially spherical cavity of the primary element (4) can be adjusted to partially and externally surround the connection section of the support piece (1), such that the mounting assembly is rotatively coupled."

U.S. Pat. No. 5,302,125 to Charles D. Kownacki, and Wade W. Prescott, titled "Dental prosthetic implant" discloses, inter alia, "A dental prosthetic implant which has angular rotational capability and improved locking between the implant fixture and the abutment prosthesis. The rotation and locking system includes an implant fixture with an internal spherical radius at its upper portion. A top seat with the same spherical radius is secured to the top portion of the fixture. A locking element configured as a sphere with flexible locking fingers on its lower portion and an internal cylindrical bore through its center that has a conically tapered lower portion is received between the implant fixture and the main body of the abutment. The conically tapered lower portion may taper inwardly or outwardly and is engaged by a similarly configured portion of the flexible fingers. A threaded portion of the locking screw engages in a threaded bore in the implant providing the force to bias the flexible fingers outwardly into firm engagement with a complementarily configured surface on the fixture, as well as increasing the pressure between the upper surface of the locking element and the nether surface of the top seat."

Anchors are commonly used as fixing or positioning members for devices which attach thereto. The anchor is typically threaded onto a patient's bore which is first drilled. The anchor provides a fixation member for an adaptor, which in turn provides an interface between the anchor and a structure. It may be desirable to provide an adjustable angle anchor system which provides a clinician much versatility of structures selection and positioning, while improving load-bearing, and reducing the total number of components required, therefore simplifying the anchoring process.

SUMMARY OF THE INVENTION

In the following disclosure, aspects thereof are described and illustrated in conjunction with systems and methods which are meant to be exemplary and illustrative, not limiting in scope.

Accordingly, it is an object of the present invention to provide a novel medical adaptor that facilitates both easy and larger angular displacement of mechanically attached structures with respect to the anchors implanted onto a biological base, such as a bone. The adaptor can be non-bindingly attached on to the anchor using fixation bolts.

One aspect of the present invention generally concerns an adaptor, comprising an adaptor body extending between a fitment end and a mortar lip. The adaptor comprises a fitment extending away from the fitment end and a mortar extending away and integral with the fitment to terminate at a perch. The adaptor further comprises a collet that may be accommodated onto the mortar of the adaptor. The collet comprises a shrinkable collet face, a collet hole extending from a collet head towards a collet tail wherein the collet hole may threadingly receive a collet bolt such that when the collet bolt is inserted in the collet hole, the collet is avoided from getting shrunk, and is, retained in a free state.

Generally, the collet is a resilient and deformable.

Possibly, the collet is shrunk before inserting onto the mortar using any commercially available tool. Alternatively, the collet may be shrunk using hands.

Optionally, a structure to be mounted is laid on the adaptor such that the structure bears against the perch.

Possibly, the perch is of a stepped design having a bank extending generally transversely to and with the perch to terminate at an adaptor top.

Potentially, the collet comprises latitudinal relief recess formed onto the collet face and extending about the collet.

Further potentially, the collet face comprises a plurality of shrinkable collet segments longitudinally extending generally transversely away from the relief recess in a direction opposite to the collet tail. The plurality of collet segments are separated by a plurality of slits extending inwardly through the collet face to merge with the collet hole.

Possibly, the plurality of collet segments is avoided from shrinking when the collet bolt is inserted into the collet hole.

Moreover, the collet comprises a tail ring disposed at the collet tail. The tail ring is formed of a rigid material and serves as a nut for the collet bolt when inserted in the collet hole.

Possibly, the adaptor comprises a lip caliber $C_L$ to receive the collet at a collet caliber $C_{SC}$ in a shrunk state.

Further possibly, the lip caliber $C_L$ is larger than collet caliber $C_{SC}$ thereby allowing the passage and rotation of the collet there through.

Further, the lip caliber $C_L$ receives and locks the collet at a collet caliber $C_{FC}$ in a free state.

Furthermore, the lip caliber $C_L$ is smaller than collet caliber $C_{FC}$ thereby retaining the collet in the free state against the mortar.

Possibly, the adaptor can be connected to an underlying anchor.

Further possibly, the anchor comprises a socket having a socket floor extending longitudinally and rearwardly away from an anchor head through an anchor body and a threaded bore extending longitudinally and rearwardly away from the socket floor.

Moreover, the mortar comprises a centrally disposed mortar bore extending away from a generally spherical mortal face towards the fitment. The mortar bore is configured to threadingly receive a fitment bolt therein to tighten the adaptor on to an anchor.

Another potential aspect of the present disclosure is concerned with a method for mounting an adaptor onto an anchor mounted on a biological base such as a bone. A fitment is inserted into a socket of the anchor. Thereafter, a fitment bolt is inserted through the mortar bore into a threaded bore of the anchor. The fitment bolt is then threaded within the bore of the anchor to tighten the adaptor onto the anchor.

Yet another potential aspect of the present disclosure is concerned with a method for mounting and angularly adjusting a structure using an adaptor of the present invention. A collet, in a shrunk state, is inserted onto mortar of the adaptor through a mortar lip, and is allowed to rebound back to its free state. The structure to be mounted is then laid on the adaptor, bearing against a perch of the adaptor. Thereafter, a collet bolt is threaded within a collet hole through the structure such that the collet is barred from getting shrunk. The collet is then rotated to achieve an angular adjustment of the structure against a perch of the collet. The collet in the free state is then tightened against a mortar face and mortar lip of the adaptor. Further, the collet bolt is locked with a tail ring acting as a nut.

Exemplary and/or illustrative embodiments of the present disclosure will be presented herein below in the following figures, by way of example only. The figures are not necessarily to scale, and some features may be exaggerated or minimized and/or roughly shown and/or omitted entirely, to show details of particular components, intending that the present disclosure may become more fully understood from the detailed description and the accompanying schematic figures, wherein:

BRIEF DESCRIPTION OF THE DRAWINGS

Exemplary and/or illustrative embodiments of the present disclosure will be presented herein below in the following figures, by way of example only. The figures are not necessarily to scale, and some features may be exaggerated or minimized and/or roughly shown and/or omitted entirely, to show details of particular components, intending that the present disclosure may become more fully understood from the detailed description and the accompanying schematic figures, wherein.

DETAILED DESCRIPTION OF THE INVENTION

Figure 1:
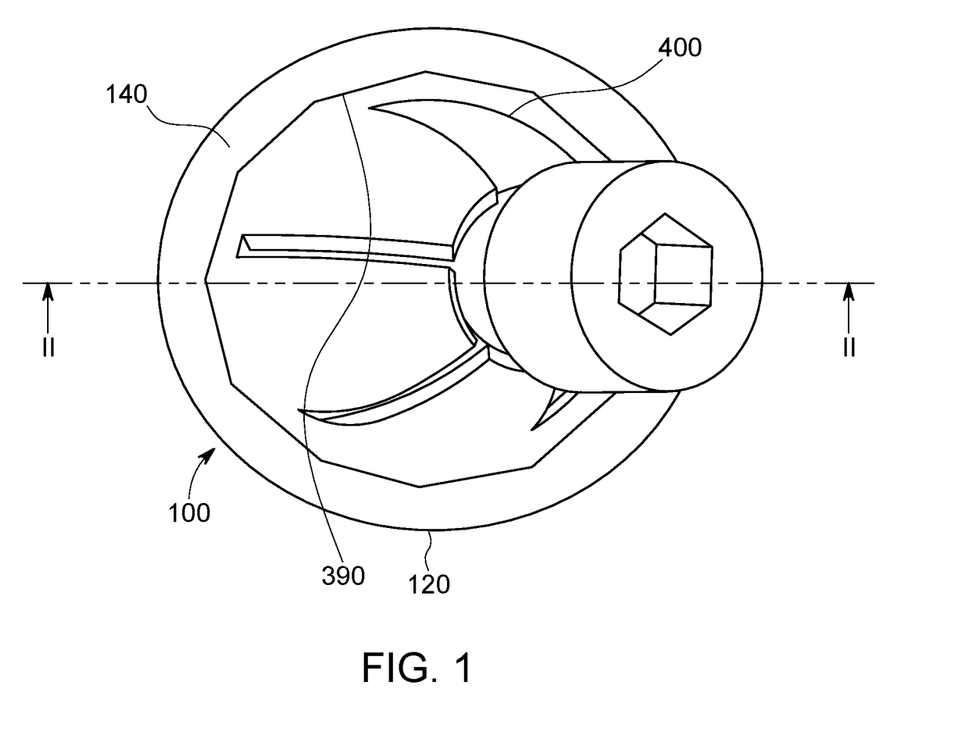
FIG. 1 schematically illustrates a generalized top view of an exemplary impression of an adjustable angle adapter in accordance with an embodiment of the present disclosure.

Attention is presently drawn to FIG. 1. An adjustable angle adaptor 100 is exemplarily embodied. The adaptor 100 comprises an adaptor body 120 designed to be interfaced with any appropriate known and/or developed anchor [schematically portrayed in FIG. 2], and a perch 140 for interacting with any appropriate known and/or developed structure [schematically portrayed on FIG. 5].

Figure 2:
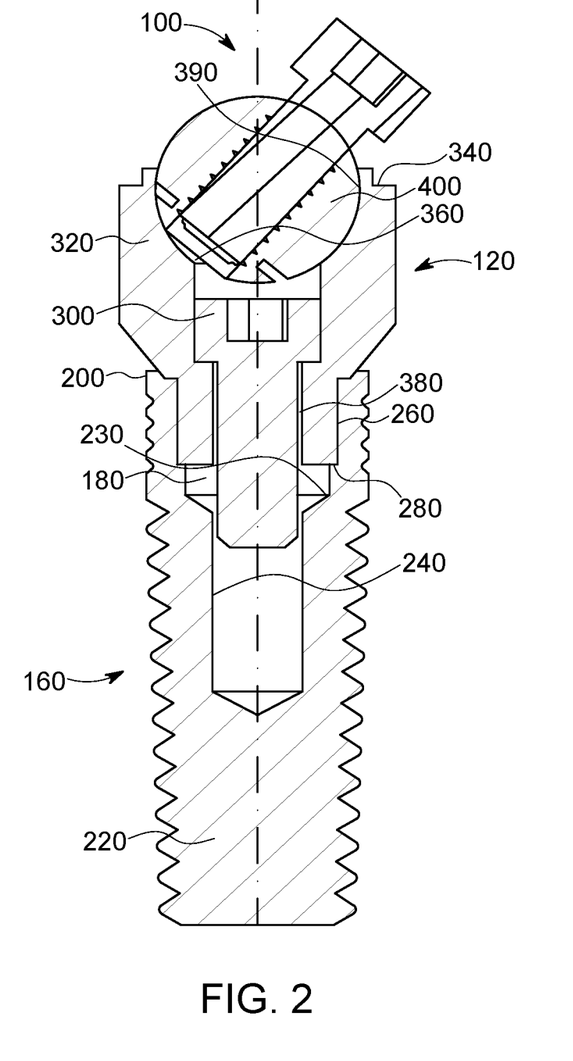
FIG. 2 schematically illustrates a generalized longitudinal cross-section view of an anchor carrying the adaptor shown in FIG. 1, taken along the line II-II in FIG. 1.

As can best be seen in FIG. 2, the adaptor body 120 can be mounted and made to interface with any known or developed anchor, schematically-only sketched as anchor 160, thus releasing both patients and practitioners from an additional unwanted burden of replacing the anchor whenever there is a need of replacement or readjustment of a structure [not shown] interfacing with the adaptor 100, which otherwise is an invasive and a painful process. As is well-known in the art, the anchor 160 may comprise a socket 180 extending longitudinally and rearwardly away from an anchor head 200 through an anchor body 220, and a threaded bore 240 extending longitudinally and rearwardly away from a socket floor 230 disposed longitudinally rearwardly to the anchor head 200. In some embodiments, the socket 180 is a hex connector. In other embodiments, the socket 180 may be of any existing, desired, or yet to be developed design.

Figure 3:
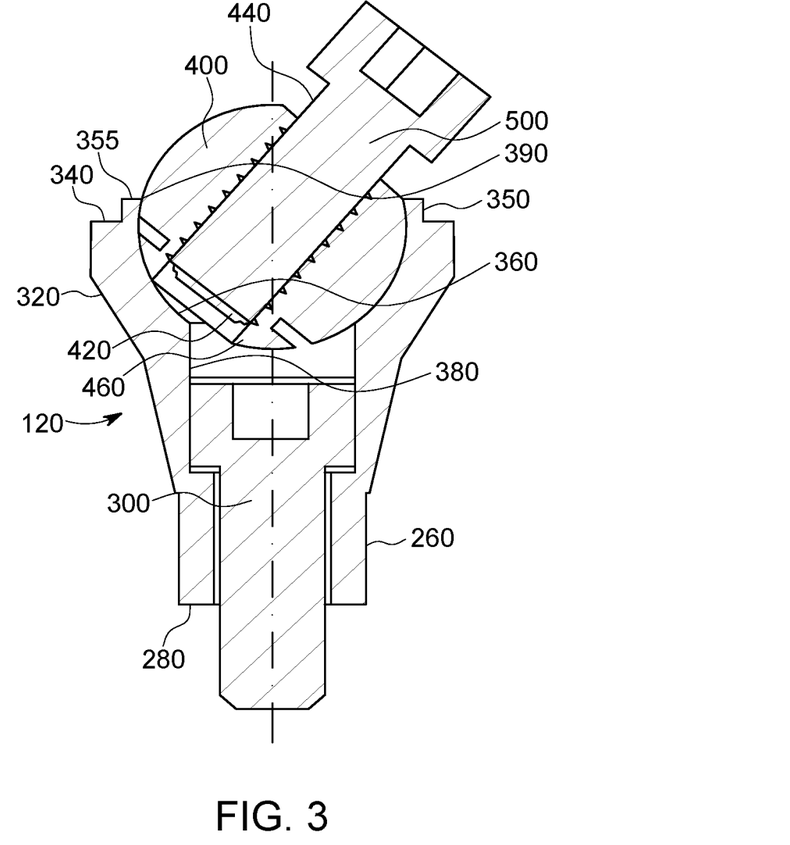
FIG. 3 schematically illustrates a generalized longitudinal cross-section detail view of the adaptor shown in FIG. 1, taken along the line II-II in FIG. 1.

Attention is additionally directed to FIG. 3. The adaptor 100 comprises a fitment 260 at a fitment end 280 thereof. The fitment 260 can be designed to fit and interface with any known and/or developed anchor 160. The fitment 260 may comprise a fitting bolt 300 designed to tighten the fitment 260 onto the anchor 160. The same fitment bolt 300 may also be used to release the fitment 260. The adaptor 100 further comprises a mortar 320 integrally formed with the fitment 260 and extending away from the fitment end 280 to terminate at a perch 340. Portrayed herein is a generalized, optional perch 340 of a stepped design, having a bank 350 extending generally transversely to and potentially [but not necessarily] with the perch 340, to terminate at an adaptor top 355. The perch 340 may be designed to fit any applicable, known and/or developed, structure [schematically illustrated on FIG. 5].

The mortar 320 comprises a generally spherical mortar face 360. The mortar face 360 comprises a centrally disposed mortar bore 380 extending away therefrom to facilitate installation of the fitment bolt 300 onto the anchor 160 [not shown on FIG. 3 and FIG. 4], as well as removal therefrom, if required. The mortar face 360 further comprises a mortar lip 390 disposed away from the bore 380 at the meeting of the mortar face 360 and the perch 340. The mortar 320 accommodates a collet 400 [best portrayed on FIG. 4]. The collet 400 has a threaded collet hole 420 extending there through from a collet head 440 to a collet tail 460. A terminus 480 of the collet head 440 and the collet hole 420 has a general CSC shape, to facilitate insertion of a collet bolt 500 into the collet 400.

Figure 4:
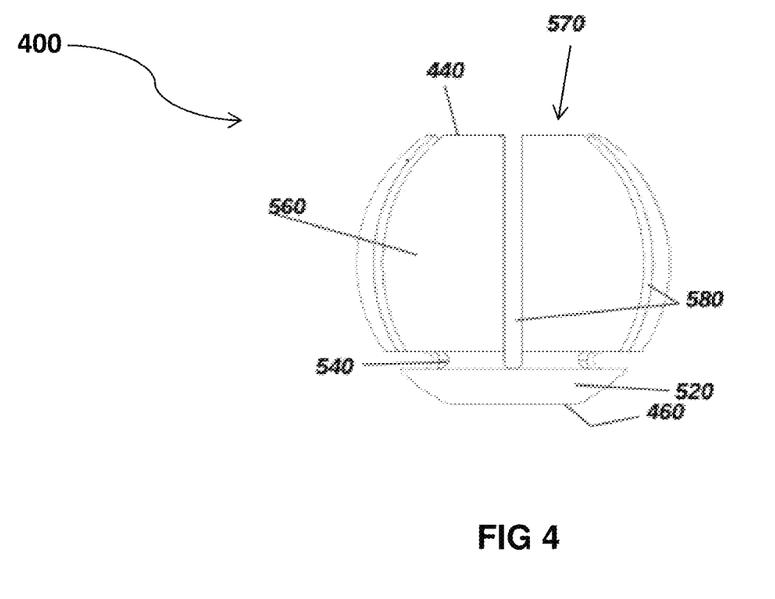
FIG. 4 schematically illustrates a generalized side-view of a collet of the adjustable adaptor of FIG. 1.

Attention is currently directed to FIG. 4. The collet 400 comprises a collet face 560 extending about the collet 400. A relief recess 540 formed latitudinally onto the collet face 560 also extends about the collet 400 Extending generally transversely away from the relief recess 540 in a direction opposite to the collet tail 460 are a plurality of longitudinally extending segments 570 separated by a plurality of slits 580. As can best be seen on FIG. 3, at least several of the plurality of slits 580 extending inwardly through the collet 400 from the collet face 560 through the collet 400 to merge with the threaded collet hole 420 and from the relief recess 540 to the collet head 440. The collet 400 further comprises a tail ring 520 disposed at the collet tail 460.

Figure 5:
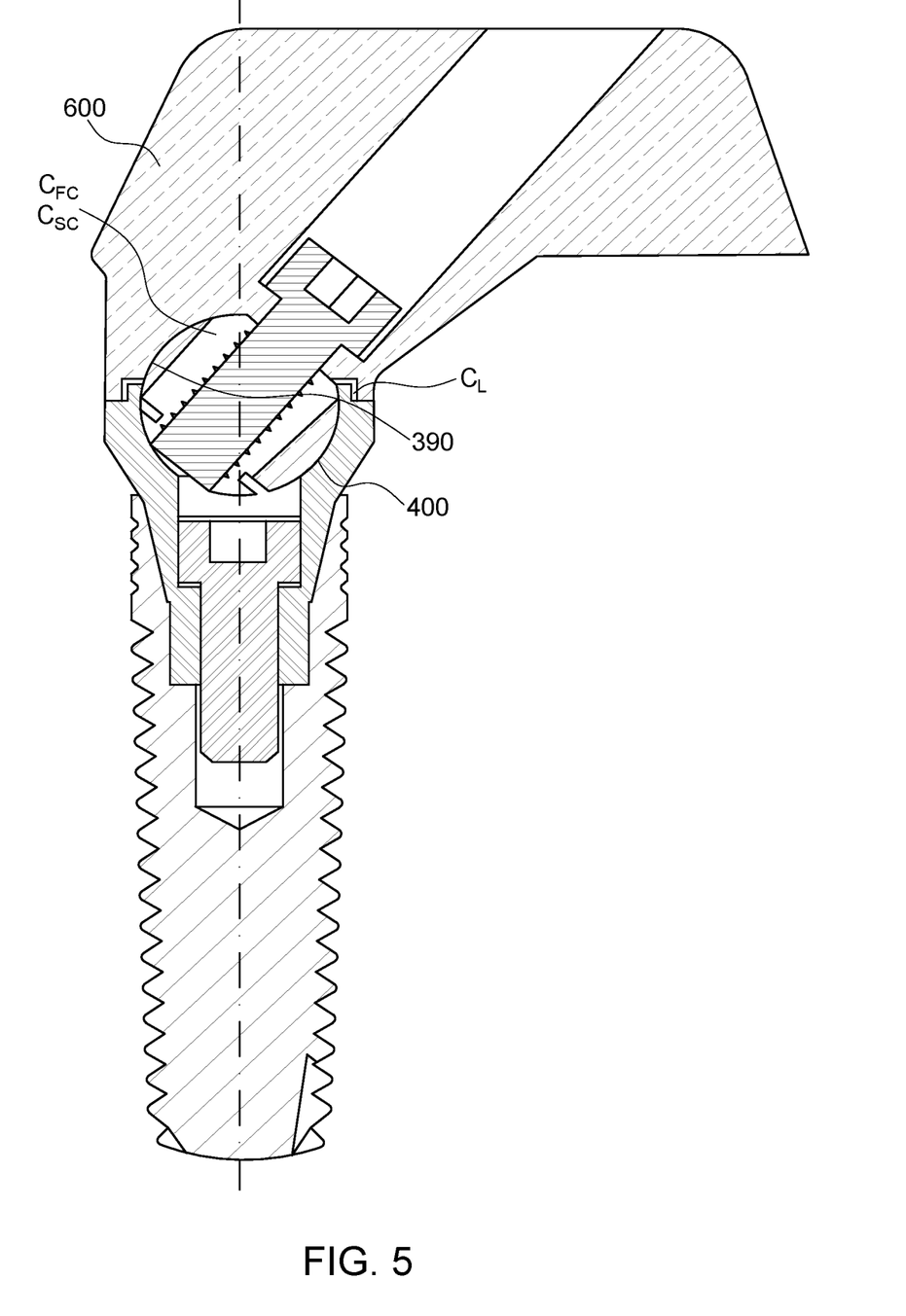
FIG. 5 is a schematic longitudinal cross-sectional view detail view of the collet mounted in an adaptor body of the adjustable adapter shown on FIG. 1.

Attention is currently directed to FIG. 3 and FIG. 5. The collet 400 is resilient, shrinks to a shrunk state when a pressure is applied and rebounds to a free state when pressure is removed. The collet 400 in a free state is avoided from getting shrunk when the collet bolt 500 is threaded into the collet hole 420 urging the segments 570 to retain their free state even under pressure. The mortar lip 390 has a lip calibre $C_L$, allowing the collet 400 to be inserted onto the mortar 320 when the collet 400 is in a shrunk state. In an embodiment, the collet 400 may be shrunk by hand. In other embodiments collet 400 may be shrunk using any commercially available tool. In its shrunken state, a collet shrunk calibre $C_{SC}$ is smaller than the lip calibre $C_L$, while in its free state, a collet free calibre $C_{FC}$ is larger than the lip calibre $C_L$ to lock and tighten the collet 400 to the mortar face 360 and against the mortar lip 390, thereby locking the collet 400 into any feasible angular position. The angular position of the collet 400 can be varied endlessly and is not limited by lip calibre $C_L$. The tail ring 520 is more rigid than the collet segments 570, serving as a nut to secure the collet bolt 500. A general illustrative-only, schematic rendering of a structure 600 is shown in FIG. 5, describing a possible manner of such structure that it is supported only on the perch 340 designed to fit there onto.

Figure 6:
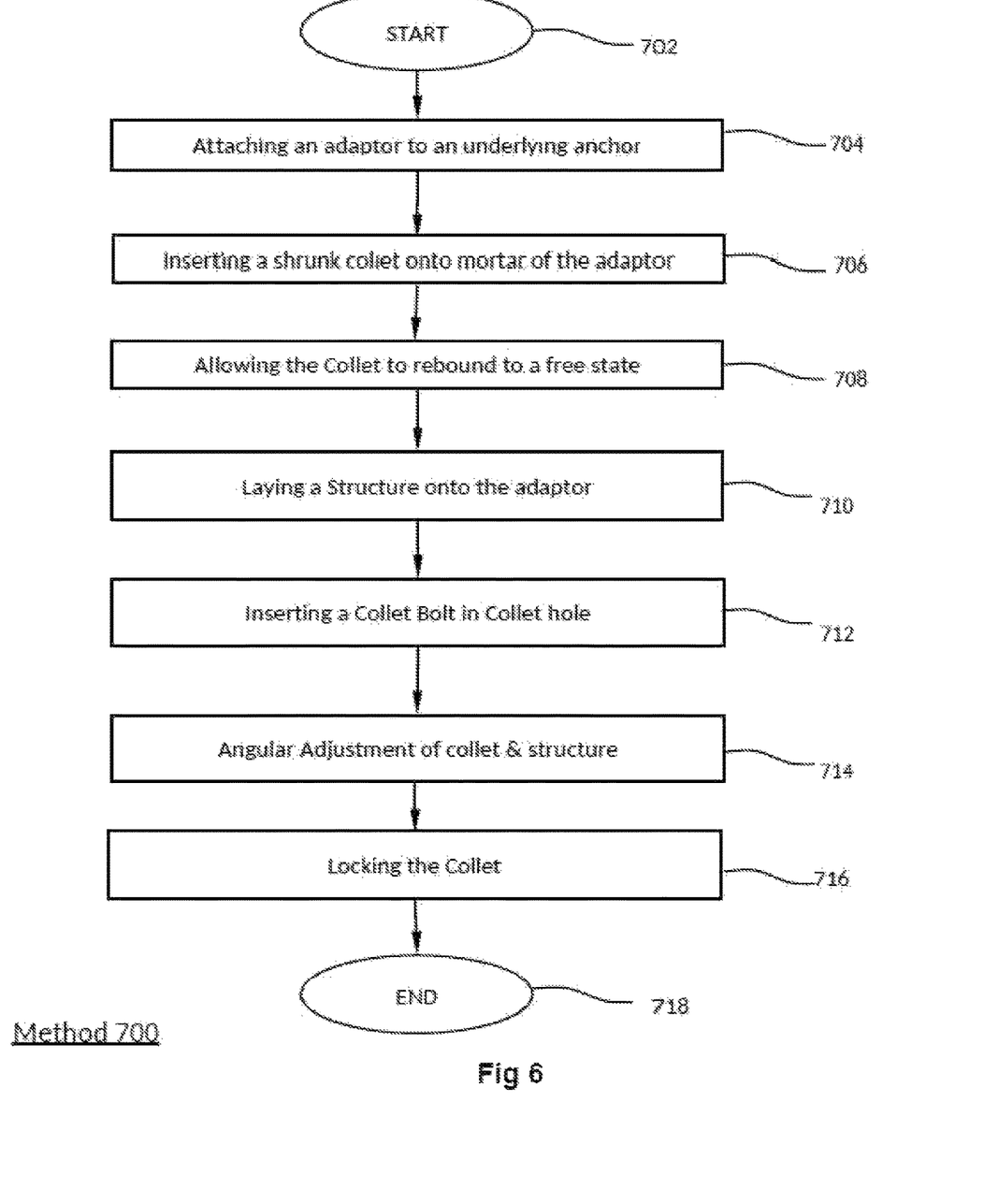
FIG. 6 is a flow diagram illustrating a method of mounting and angularly adjusting a collet in an adaptor body of adjustable adapter shown on FIG. 1.

FIG. 6, with reference to FIGS. 1 through 5, is a flow diagram illustrating a method of mounting and angularly adjusting a structure onto a biological base using an adaptor of the present invention. The method 700 starts at step 702 and proceeds to step 704 where an adaptor 100 is mounted onto a schematic, exemplary-only anchor 160. This is performed by first inserting the fitment 260 onto the socket 180 with the fitment end 280 first entering the socket 180. Thereafter, the fitment bolt 300 is inserted through the mortar bore 380, to tighten the adaptor 100 onto the anchor 160.

Once the adaptor is tightened onto the anchor, the method moves to step 706 where the collet 400, in its shrunken state, is inserted, through the mortar lip 390 onto the mortar 320. In some embodiments, the collet 400 may be shrunk by applying pressure using hands. In other embodiments, any commercially available tool may be used to shrink the collet 400. The method 700 further comprises step 708, where the collet 400 in its shrunk state, inserted onto the mortar is allowed to rebound back to a free state under an effect of its elasticity. The structure 600 is then laid over the adaptor 100 to bear against the perch 340 at step 710.

Thereafter, method proceeds to step 712 where the collet bolt 500 is inserted through the structure 600, as is well known in the art, onto the terminus 480 of the collet 400, aligning the collet 400 with the collet bolt 500. The insertion of collet bolt 500 causes the collet 400 to retain its free state as the segments 570 are avoided from getting shrunk. The collet is then rotated and adjusted to achieve a desired angular position at step 714, which in turn also adjusts the structure 600 at the desired angular position while it is supported onto the perch 340. The method 700 further comprises step 716 where the collet 400 is locked onto the mortar face 369 by inserting the collet bolt 500 completely onto the collet 400 urging the collet 400 to its free caliber $C_{FC}$. In such a state, the collet free calibre $C_{FC}$ is larger than the lip calibre $C_L$ of mortar lip 390 and locks the collet 400 to the mortar face 360 and against the mortar lip 390. Further, the tail ring 520 serving as a nut [as is well known in the art] also locks the collet bolt 500. Accordingly, the collet bolt 500 tightens the structure 600 onto the perch 340.

Throughout the specifications of the present disclosure, the term "comprising" means including but not necessarily to the exclusion of other elements or steps. In other words, the term comprising indicates an open list. Furthermore, all directional references (such as, but not limited to, upper, lower, inner, outer, upward, downward, inwards, outwards, right, left, rightward, leftward, inside, outside, top, bottom, above, below, vertical, horizontal, clockwise, and counter=clockwise, lineal, axial and/or radial, or any other directional and/or similar references) are only used for identification purposes to aid the reader's understanding of illustrative embodiments of the present disclosure, and may not create any limitations, particularly as to the position, orientation, or use unless specifically set forth in the claims. Moreover, all directional references are approximate and should not be interpreted as exact, but rather as describing a general indicator as to an approximate attitude.

Similarly, joinder references (such as, but not limited to, attached, coupled, connected, accommodated, and the like and their derivatives) are to be construed broadly and may include intermediate members between a connection of segments and relative movement between segments. As such, joinder references may not necessarily infer that two segments are directly connected and in fixed relation to each other.

In some instances, components are described with reference to "ends" having a particular characteristic and/or being connected with another part. However, those skilled in the art will recognize that the present disclosure is not limited to components which terminate immediately beyond their points of connection with other parts. Thus, the term "end" should be interpreted broadly, in a manner that includes areas adjacent, rearward, forward of, or otherwise near the terminus of a particular segment, link, component, part, member or the like. Additionally, all numerical terms, such as, but not limited to, "second", "second", "third", "fourth", or any other ordinary and/or numerical terms, should also be taken only as identifiers, to assist the reader's understanding of the various embodiments, variations and/or modifications of the present disclosure, and may not create any limitations, particularly as to the order, or preference, of any embodiment, variation and/or modification relative to, or over, another embodiment, variation and/or modification.

In methodologies directly or indirectly set forth herein, various steps and operations are described in one possible order of operation, but those skilled in the art will recognize that steps and operations may be re-arranged, replaced, or eliminated without necessarily departing from the spirit and scope of the present disclosure as set forth in the claims. It is intended that all matter contained in the above description or shown in the accompanying drawings shall be interpreted as illustrative only and not limiting. Changes in detail or structure may be made without departing from the spirit of the present disclosure as defined in the appended claims.

While exemplary embodiments were described and shown in the accompanying drawings, it is to be understood that such embodiments are merely illustrative of and not restrictive on the broad present disclosure, and that the present disclosure may not be limited to the specific constructions and arrangements shown and described, since various, other modifications and/or adaptations may occur to those of ordinary skill in the art. It is to be understood that individual features, which may have been shown or described for the exemplary embodiments, should be understood in the context of functional segments and that such features may be replicated, or be omitted within the scope of the present disclosure and without departing from the spirit of the present disclosure as may be defined in the appended claims. Similar elements that may have appeared and/or mentioned in association with more than one embodiment should not be taken as instructing and/or implying any limitation on the scope of the present disclosure as may be defined in the appended claims. While some features were shown and/or discussed in the context of one exemplary embodiment, and other features may have been shown and/or discussed in the context of another exemplary embodiment, such features may appear mixed, or omitted, all without departing from the spirit of the present disclosure as may be defined in the appended claims.

The invention claimed is:

1. An adaptor for angularly adjusting a structure on an anchor mounted on a biological base, comprising:
    an adaptor body extending between a fitment end towards a perch;
    a fitment and a mortar extending away from the fitment end and integrally formed with the fitment, said mortar comprising a mortar face that is spherical to terminate with a mortar lip at the perch;
    a collet that is shrinkable, the collet being rotatable onto the mortar face and comprising a collet face, a threaded collet hole extending from a collet head towards a collet tail, wherein the collet is resiliently deformable from a free state to a shrunken state and reboundable from the shrunken state to the free state, wherein a shrunk caliber $C_{SC}$ of the collet in the shrunken state is smaller than a free collet caliber $C_{FC}$ of the collet in the free state, wherein the collet is receivable on the mortar in the shrunken state, and wherein the collet rebounds upon placement on to the mortar; and a collet bolt threadingly receivable into the collet hole such that when the collet bolt is inserted in the collet hole, the collet face is avoided from getting shrunk and retains the free collet caliber, $C_{FC}$, of the collet in the free state, thereby adjustably mounting the structure onto the adaptor bearing against the perch.

2. The adaptor of claim 1, wherein the collet face comprises a plurality of shrinkable collet segments separated by a plurality of collet slits extending inwardly and merging towards the collet hole.

3. The adaptor of claim 2, wherein the plurality of collet segments shrink when pressure is applied upon them.

4. The adaptor of claim 1, wherein the mortar lip comprises a lip caliber $C_L$ larger than the collet shrunken caliber $C_{SC}$ such that it allows receiving the collet in its shrunken state, onto the mortar.

5. The adaptor of claim 4, wherein the lip caliber $C_L$ is smaller than the collet free caliber $C_{FC}$ such that it locks the collet in its free state, onto the mortar.

6. The adaptor of claim 2, wherein the-collet further comprises a tail ring extending away from the collet segments through a relief recess about the collet and disposed at the collet tail.

7. The adaptor of claim 1, wherein the mortar comprises a centrally disposed mortar bore extending away from a spherical mortal face towards the fitment wherein the mortar bore is configured to receive a fitment bolt therein to tighten the adaptor on to an underlying surface.

8. A combination of an anchor and the adaptor of claim 1, wherein the anchor is connected to said adaptor, said anchor comprising a socket having a socket floor extending longitudinally and rearwardly away from an anchor head through an anchor body and a threaded bore extending longitudinally and rearwardly away from the socket floor wherein the fitment of the adaptor is attachable to the socket of the anchor via a fitment bolt.

* * * * *